United States Patent Office

3,574,044
Patented Apr. 6, 1971

3,574,044
PRINTED FILM OF POLYBUTENE-1
Thomas Hugh Shepherd, Hopewell, N.J., assignor to Princeton Chemical Research, Inc., Princeton, N.J.
No Drawing. Filed Feb. 11, 1965, Ser. No. 432,004
Int. Cl. B29d 7/24; B44f 5/00
U.S. Cl. 161—6                                    4 Claims

ABSTRACT OF THE DISCLOSURE

Method of making printed polybutene-1 by forming a film of such polymer; stretching the film an amount sufficient to cause the film to become opaque; and treating selected portions of thus stretched film with heat and/or pressure under conditions sufficient to render such portions substantially transparent.

---

This invention relates to printing on polymers which are substantially opaque and which, on being subjected to total or selective pressure and/or heat, become transparent. Additionally, this invention relates to processes for opacifying such polymers. More specifically, this invention relates to both, methods of manufacturing sheets or films of polybutene-1 which are substantially opaque and methods of subjecting opaque polybutene-1 to pressure or heat, whereby the polymer becomes substantially transparent in the areas treated.

In the past, most printing operations have been conducted by physically transferring ink from a printing surface to a substrate and/or embossing or by selectively developing chemically treated substrates by chemical and/or physical means.

It is an object of this invention to provide a non-embossing printing method that is a substantial departure from prior printing methods, and which represents an advance in the state of the printing art, whereby printing on a surface may be achieved without ink transference or by chemical means.

Another object of this invention is to provide means for printing without substantial physical deformation of the print-receiving means.

An additional object of this invention is to provide polybutene-1 polymers as film or sheets that are essentially opaque and will become substantially transparent upon being subjected to pressure and/or heat.

These and other objects of the invention are achieved in accord with the discovery that transparent to translucent film or sheeting, formed from substantially isotactic polybutene-1, may be stretched to provide a white, nearly opaque sheet or film. Subsequent selective or total application of pressure and/or heat to the surface of the sheet or film causes the polymer to become substantially transparent in the area subjected to pressure or heat. These properties, however, are not common to either ethylene or propylene polymers.

The polybutene-1 useful in this invention has a melt index between 0.1 and 25, as determined by the American Society for Testing Material procedure ASTM D–1238T. The polybutene-1 is also substantially isotactic and is 80 percent insoluble in diethyl ether. The polymer is formed into a film or sheet preferably by extrusion, but calendering or other methods well known in the art may be used. The thickness of the extruded or calendered product may vary from 0.5–35 mils. After forming, the polymer is aged at least three days and preferably four to eight days before stretching to develop opacity. This is approximately the time required for conversion of the Form II metastable crystalline state of polybutene-1 (which is the form obtained on cooling from the melt) to the stable crystalline Form I. Isotactic polybutene-1 is unique among the polyolefins in that it exists in at least three polymorphic forms. Upon quenching the polymer from the melt, a crystalline form of the polymer, commonly referred to as Form II polybutene-1 is obtained. Form II polybutene is well characterized by its IR spectra, DTA curves, and specific volume-temperature relationship, and other parameters, and has been described as a tetragonal crystalline form. At room temperature, Form II polybutene spontaneously converts to a stable crystalline form referred to as Form I polybutene-1. The rate of conversion of Form II polymer to Form I varies with the molecular weight and purity of the polymer, as measured by the ash content. The conversion is usually essentially complete after four to seven days at room temperature. The application of stress or pressure to Form II polybutene also results in its conversion to Form I polymer. Form I polybutene-1 has been described as a rhombic crystalline form, and is well characterized by its distinctive infrared spectrum, density, DTA curve, mechanical properties, and the like. Although applicant does not wish to be limited by any theory of the invention, it is believed that the development of opacity upon stretching is a characteristic of the polybutene-1 in the Form I crystatlline state and does not occur with polybutene-1 in the Form II or metastable crystalline state.

The degree of opacity developed in the film on stretching increases as the degree and rate of stretching is increased. The percent elongation of a film, after the stressing operation is completed, should be at least 50 percent, and preferably 150 to 350 percent, although a range of elongation from 50 percent to 250 percent is contemplated. The opacity obtained in the film is dependent on the rate at which stretching takes place. Maximum opacity occurs at high stretching rates, i.e., stretching rates up to and greater than 2 500 percent/min. At low rates of strain, e.g., 10 percent/min., no decrease in light transmission of the film occurs, and only moderate decreases in light transmission occur at stretching rates between 100 and 500 percent/min. The rates of stretching, however, may vary from 100 up to greater than 2 500 percent/min.

Application of pressure to the nearly opaque film causes the film to become transparent to translucent, whereby the film has about the same light transmission characteristics as the original unstretched film. The minimum pressure required to cause this transformation varies from 750–800 p.s.i., but pressures varying from 750 up to and over 1,500 p.s.i. are suitable in addition to pressures up to 20,000 p.s.i., especially 10,000 p.s.i. and notably 1,000–1,500 p.s.i The opaque film also becomes transparent when subjected to heat. Opacity disappears at a temperature of approximately 87° C., but the transformation is substantially complete at 92° C. This temperature range is approximately 30° C. below the crystalline melting point of Form I polybutene-1. It is preferred to use temperatures above 90° C. but less than 100° C. to prevent distortion of the film; thus, the preferable temperature range for converting the film to a substantially transparent state therefore comprises from 87° C. to 100° C.

It is a particular advantage that the clarification temperature of the opaque polybutene-1 film ranges from 87° C. to 100° C., since this permits use of the opaque film in heat copying machines. This high clarification temperatures also lessen the chance of undesired development or complete clarification of the opaque film at ambient temperature, and, in this respect, is very much like the chemically treated heat copy papers presently available; however, no chemical treatment of the polymer is required.

Small quantities of dyes or pigments can be incorporated in the film which, when stretched, provide an opaque material having a light color. Application of pressure to the film then causes the color of the dye or pigment to appear in those areas made transparent by the application of pressure. The quantity of dye or pigment should be 1 percent or less by weight of the polymer, and preferably between 0.01 and 0.5, however, greater or lesser amounts may be used.

Suitable dyes and pigments include: paratoner red, quinacridone red, benzidine yellow, phthalocyanine blue, phthalocyanine green, carbon black, bone black, nickel-azo-yellow, alizarin maroon, thioindigogoid, indanthrone blue, and Helio-Bordeaux maroon, and others well known in the art.

The stretched opaque polybutene-1 film may also be laminated to a colored or non-colored substrate, such that, after application of pressure to the laminate, the color or background of the substrate appears through the transparent areas of the polybutene member of the laminate. Suitable adhesives for carrying out laminations to a variety of substrates, such as metal foils, colored paper, colored plastic films, wood and ceramics, include: SR-585 silicone, manufactured by the General Electric Company; Shawinigan D-276, a vinyl acetate copolymer latex manufactured by the Shawinigan Division of Monsanto Chemical Corporation; natural and nitrile rubber formulations incorporating tackifiers; Vistanex types based on polyisobutylene; and formulations of various resins, such as ethylene-vinyl acetate copolymers and polybutene-1 formulated with tackifying plasticizers.

The above adhesives may also be coated on one surface of an opaque film or laminate made in accord with the process of this invention and covered with a release backing. The films may be used as labels, decorative surfaces or protective surfaces.

The following non-limiting examples are given as certain preferred embodiments and illustrations of the invention, and are not to be construed as narrowing the novel and inventive method and article of manufacture of applicant.

EXAMPLE I

Film, 7.0 mils thick, is extruded from polybutene-1 having a melt index of 0.6, as determined by the American Society of Testing Materials procedure ASTM D-1238T, and 88 percent diethyl ether insolubility. The film is allowed to age 8 days at room temperature. Strips, 1 inch wide and 4 inches long, are cut from the film. A number of the strips are stretched rapidly to 9 inches in length, whereby they became white and opaque. Eight-hundred p.s.i. pressure is applied to a number of the stretched opaque strips by means of a piston having an area of 1 square inch. The various strips are then examined in a Coleman Spectrophotometer for light transmission characteristics. The results are recorded in Table I.

TABLE I

| Wave length, mµ | Percent transmission | | |
|---|---|---|---|
| | Unstretched | Stretched | Stretched plus pressed |
| 400 | 59 | 5.1 | 46 |
| 450 | 62.5 | 4.3 | 48 |
| 500 | 64.2 | 5.7 | 50 |
| 550 | 67.0 | 6.9 | 51 |
| 600 | 71 | 5.0 | 56 |
| 650 | 72 | 8.3 | 59 |

The above data illustrate that stretching will opacify extruded and aged polybutene-1 film which may be subsequently clarified by the application of pressure.

EXAMPLES II-VI

Strips of polybutene-1 film, prepared as in Example I, are mounted in an Instron tensile tester, using 2 inches jaw separation and were strained to three times their original length at various rates. The light transmission characteristics of strips elongated at different rates are assessed with a Coleman Spectrophotometer. The results are listed in Table II.

TABLE II

| Strain rate (in./min.) | Percent transmission at 550 mµ |
|---|---|
| 0.2 | 75 |
| 2 | 65 |
| 10 | 54 |
| 20 | 44 |
| 50 | 14 |

It can be seen from the above table that opacity of the film increases rapidly at higher strain rates.

EXAMPLE VII

A strip of polybutene-1, extruded as in Example I, and aged six days, is rapidly stretched to 2.25 times its original length. The strip is then slit to ⅜ inch width and inserted into a printing machine comprising raised type means and a planar surface, between which the film is inserted. Sufficient pressure is applied to print on the film without distorting the tape. The stretched polybutene-1 prints well, providing sharply defined, substantially transparent, clear letters on a white, nearly opaque background. The film is also written on and provides clear images.

EXAMPLE VIII

A strip of stretched, white polybutene-1 film is laminated to copper foil using Shawinigan D-267 adhesive, a vinyl acetate copolymer latex. The rear surface of the foil is also coated with adhesive and subsequently covered with silicone-treated release paper. The laminate is slit to ⅜ inch width and loaded into a printing device, as described in Example VII. Upon printing, the metallic copper color appears as sharply defined letters and figures which contrast nicely to the white, substantially opaque background of the polybutene-1. The release paper can then be stripped from the copper foil, and the printed laminate applied to various surfaces as a label.

EXAMPLE IX 100 parts of polybutene-1, having a melt index of 1.0, as measured by the American Society for Testing Materials procedure ASTM D-1238T, and 92 percent diethyl ether insolubility is mixed with 0.05 part of phthalocyanine blue on a rubber mill at 240° F. The deep blue compound is extruded at 340° F., using a flat film die to provide a film 8.0 mils thick and 4½ inches wide. The deep blue, transparent film is allowed to age eight days at room temperature. Strips of the film are then stretched rapidly to 2.25 times their original length, whereupon the film becomes very light blue and opaque. Strips of the stretched film are inserted in the printing device described in Example VII and printed. The strips, when printed, provide deep blue, transparent letters and figures, contrasted with an opaque, light blue background.

EXAMPLE X

A sheet of stretched, white, opaque polybutene-1 is held tightly against a white sheet of paper bearing black printed letters and figures. The surface of the polybutene is then exposed to an infrared lamp. After heating 1-2 minutes, an image of the printed areas appears in the polybutene-1 film as clear areas contrasted against a white background, due to the greater rate of heat absorption of the black printed figures.

Thus, there has been described a method for opacifying polybutene-1 polymers by rapid stretching. The opaque polymer can subsequently be clarified by the application of heat or pressure. This invention has utility in the printing arts, since the opaque film may be selectively clarified by heat printing means or mechanical impact printing means. Various laminates, labels and/or pigmented compositions also may be made from the opaque polymer of this invention.

Other uses for the opaque sheet or film of this invention include preparing various labels, decorative films and laminates, stencils for photocopying, heat-sensitive film, and the like.

The opaque compositions of this invention may optionally include antioxidants, lubricants, extrusion aids and stabilizers in addition to colorants.

Although the invention has been described with reference to certain preferred embodiments, it is not applicant's intention to be limited thereby, and certain obvious modifications of the process and article of manufacture are intended to be included within the broad scope of the invention, as embodied in the following claims.

What is claimed is:

1. A shaped article comprising a film consisting essentially of substantially isotactic polybutene-1 which film is substantially opaque except for at least one substantially transparent indicia therein, wherein the opacity of said film has been induced by stretching such and wherein the transparency of said indicia has been induced by applying heat or pressure in the shape of said indicia.

2. Article as claimed in claim 1 containing up to about 1% colorant therein.

3. Combination of a shaped article, as claimed in claim 1, joined with a substrate through an adhesive layer.

4. An article, as claimed in claim 3, wherein said adhesive is at least one member selected from the group consisting of silicone adhesives, acrylic copolymer latices, vinyl acetates, copolymer latices, natural rubber, nitrile rubber, polyisobutylene, and ethylene-vinyl acetate copolymers.

References Cited

UNITED STATES PATENTS

| | | | |
|---|---|---|---|
| 2,825,721 | 3/1958 | Hogan et al. | 260—93.7 |
| 2,352,725 | 7/1944 | Markwood | 264—288 |
| 2,848,752 | 8/1958 | Bechtold | 264—34 |
| 2,863,173 | 12/1958 | Zupic | 264—288 |
| 3,022,541 | 2/1962 | Passley et al. | 264—291 |
| 3,213,071 | 10/1965 | Campbell | 161—252 |
| 3,231,557 | 1/1966 | Bauer | 264—288 |

FOREIGN PATENTS 569,129  7/1958  Belgium.

ROBERT F. BURNETT, Primary Examiner

R. J. ROCHE, Assistant Examiner

U.S. Cl. X.R.

264—288; 161—252; 260—93.7